United States Patent
Kaza et al.

(10) Patent No.: US 9,448,840 B2
(45) Date of Patent: *Sep. 20, 2016

(54) CONTROLLING RUNTIME EXECUTION FROM A HOST TO CONSERVE RESOURCES

(71) Applicant: Microsoft Technology Licensing, LLC, Redmond, WA (US)

(72) Inventors: Akhilesh Kaza, Redmond, WA (US); Gunjan A. Shah, Redmond, WA (US); Shawn T. Oster, Seattle, WA (US); Jonathan D. Sheller, Seattle, WA (US); Alan C. T. Liu, Redmond, WA (US); Nimesh I. Amin, Seattle, WA (US); Randal J. Ramig, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/585,095

(22) Filed: Dec. 29, 2014

(65) Prior Publication Data

US 2015/0116339 A1  Apr. 30, 2015

Related U.S. Application Data

(63) Continuation of application No. 12/957,413, filed on Dec. 1, 2010, now Pat. No. 8,922,564.

(51) Int. Cl.
| | |
|---|---|
| *G09G 5/00* | (2006.01) |
| *G06F 9/48* | (2006.01) |
| *G06T 13/00* | (2011.01) |
| *G06T 15/00* | (2011.01) |
| *G06F 1/32* | (2006.01) |
| *G06T 1/20* | (2006.01) |

(52) U.S. Cl.
CPC ........... *G06F 9/4893* (2013.01); *G06F 1/3265* (2013.01); *G06T 1/20* (2013.01); *G06T 13/00* (2013.01); *G06T 15/005* (2013.01); *G06F 9/485* (2013.01); *Y02B 60/144* (2013.01)

(58) Field of Classification Search
CPC ..... G06T 13/00; G06T 13/20; G06F 1/3203; G09G 2330/021

See application file for complete search history.

(56) References Cited

U.S. PATENT DOCUMENTS

| | | | | |
|---|---|---|---|---|
| 6,714,201 B1* | 3/2004 | Grinstein | ................ | G06T 13/20 345/474 |
| 2009/0042609 A1* | 2/2009 | Bloebaum | ............. | G06F 1/1616 455/556.1 |
| 2010/0020035 A1* | 1/2010 | Ryu | .................... | G06F 3/04883 345/173 |
| 2011/0191666 A1* | 8/2011 | Decker | ..................... | G06F 3/14 715/234 |

* cited by examiner

*Primary Examiner* — Hau Nguyen
(74) *Attorney, Agent, or Firm* — Timothy Churna; Raghu Chinagudabha; Micky Minhas

(57) ABSTRACT

A runtime management system is described herein that allows a hosting layer to dynamically control an underlying runtime to selectively turn on and off various subsystems of the runtime to save power and extend battery life of devices on which the system operates. The hosting layer has information about usage of the runtime that is not available within the runtime, and can do a more effective job of disabling parts of the runtime that will not be needed without negatively affecting application performance or device responsiveness. The runtime management system includes a protocol of communication between arbitrary hosts and underlying platforms to expose a set of options to allow the host to selectively turn parts of a runtime on and off depending on varying environmental pressures. Thus, the runtime management system provides more effective use of potentially scarce power resources available on mobile platforms.

20 Claims, 5 Drawing Sheets

US 9,448,840 B2

CONTROLLING RUNTIME EXECUTION FROM A HOST TO CONSERVE RESOURCES

RELATED APPLICATION

This application is a continuation of and claims priority to U.S. application Ser. No. 12/957,413, filed on Dec. 1, 2010, titled "CONTROLLING RUNTIME EXECUTION FROM A HOST TO CONSERVE RESOURCES," at least some of which may be incorporated herein.

BACKGROUND

Computer users are more and more frequently using mobile devices to perform tasks once thought to require the power of desktop computers. Mobile devices today, such as smartphones, are more powerful than desktop computers of just 10 years ago, and are advancing at a pace faster than their desktop counterparts did. Current smartphones allow running applications, browsing the web, and editing documents in addition to the more traditional smartphone function of making calls. Many mobile devices include a graphics-processing unit (GPU) for offloading graphics intensive processes from the central processing unit (CPU) to more specialized hardware. Mobile devices have ever-increasing display resolutions that involve pushing more and more pixels to the screen to display content.

With the rise in computing power of mobile devices, an important consideration is battery life. Although mobile devices are powerful, leveraging the full computational power of the device all the time would lead to a battery that did not last very long. Most mobile device users expect their devices to last at least a day on a standard charge, so that the user can use the device as needed throughout the day and charge the device at night. One factor that influences mobile battery life is the execution of underlying subsystems provided by the mobile device for applications to leverage. Subsystems can include application platforms, such as a Java Virtual Machine (JVM), MICROSOFT™ SILVERLIGHT™ Mobile, the MICROSOFT™ .NET™ Compact Runtime, and so forth.

Prior runtimes have attempted to automate the task of tuning the runtime to allow the runtime to shut itself down or turn off parts of the runtime to conserve power and extend battery life. Unfortunately, the runtime often has very little knowledge of how it will be used by an application that invokes it. If the runtime chooses to shut down a component or service that the application will soon attempt to use, then the runtime may introduce undesirable application delays and cause the mobile device to feel sluggish to the user as the runtime "wakes up" to handle the user's requests.

SUMMARY

A runtime management system is described herein that allows a hosting layer to dynamically control an underlying runtime to selectively turn on and off various subsystems of the runtime to save power and extend battery life of devices on which the system operates. The hosting layer has information about usage of the runtime that is not available within the runtime, and can do a more effective job of disabling parts of the runtime that will not be needed without negatively affecting application performance or device responsiveness. The runtime management system includes a protocol of communication between arbitrary hosts and underlying platforms to expose a set of options to allow the host to selectively turn parts of a runtime on and off depending on varying environmental pressures. Thus, the runtime management system provides more effective use of potentially scarce power resources available on mobile platforms.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
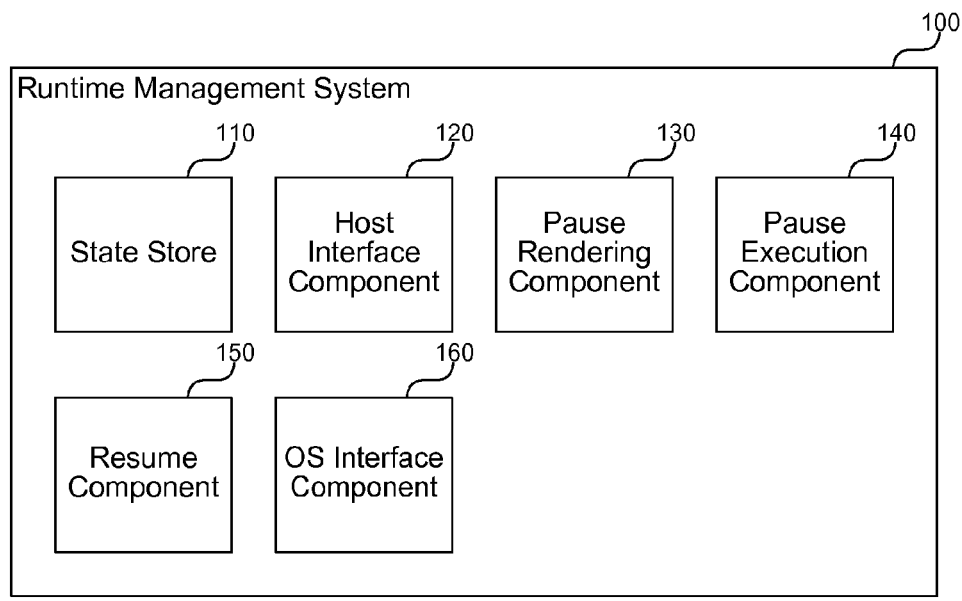
FIG. 1 is a block diagram that illustrates components of the runtime management system, in one embodiment.

A runtime management system is described herein that allows a hosting layer to dynamically control an underlying runtime to selectively turn on and off various subsystems of the runtime to save power and extend battery life of devices on which the system operates. The hosting layer has information about usage of the runtime that is not available within the runtime, and can do a more effective job of disabling parts of the runtime that will not be needed without negatively affecting application performance or device responsiveness. The runtime management system includes a protocol of communication between arbitrary hosts and underlying platforms to expose a set of options to allow the host to selectively turn parts of a runtime on and off depending on varying environmental pressures. For example, the system can provide a Component Object Model (COM) or other application programming interface (API) through which a host can instruct the runtime to turn parts of the runtime on or off. The protocol can be scaled to arbitrary platforms to achieve a high degree of flexibility from the host without having to fragment the runtime. Thus, the runtime management system provides more effective use of potentially scarce power resources available on mobile platforms.

As one example, MICROSOFT™ SILVERLIGHT™ is a runtime that allows itself to be hosted in a variety of different environments. MICROSOFT™ SILVERLIGHT™ began as a browser plugin but is quickly spreading to other ecosystems and includes standalone environments for several hardware platforms. MICROSOFT™ SILVERLIGHT™ now allows arbitrary hosts to be able to allow the runtime to execute within their confines subject to a set of rules that the host gets to configure. The runtime provides a set of COM contracts with which the host can control the plugin. The runtime management system extends these contracts to include a pause and resume construct with configurable parameters that the host can set/unset to make intelligent choices about how to utilize the runtime efficiently. The implementation itself is not tied to COM and is hence very extensible.

In some embodiments, the runtime provides multiple levels of pausing to reduce resource usage: rendering only and pausing of rendering and execution. Pausing rendering keeps the whole subsystem executing but simply turns off rendering. One usage pattern for this functionality is to allow playing of media but conserve battery by not rendering when the media application is obscured by another application. Since the user cannot see the media anyway, rendering the media just consumes resources unnecessarily. When everything is paused (i.e., rendering and execution), the system produces a state of suspension for the application at large. This type of pausing may or may not block common language runtime (CLR) threads. This level of pausing can be used to enable background processing when the resources on a device are low. Following is an example interface contract for the behavior described herein between a host and a runtime:

```
enum __MIDL__IXcpControl3_0001
    {    XcpPauseOption_Rendering = 0x1,
     XcpPauseOption_Execution = 0xffffffff
    }    XcpPauseOptions;
EXTERN_C const IID IID_IXcpControl3;
MIDL_INTERFACE("6CA58BCA-92D3-419b-A271-
F475B2B657F5")
IXcpControl3 : public IXcpControl2
{
public:
    virtual HRESULT STDMETHODCALLTYPE Pause(
        DWORD dwOptions) = 0;
    virtual HRESULT STDMETHODCALLTYPE Resume( void)
= 0;
    virtual HRESULT STDMETHODCALLTYPE GetHwndAt(
        /* [in] */ POINT pt,
        /* [out] */ HWND *pHwnd,
        /* [out] */ POINT *pptHwndOrigin,
        /* [out] */ BOOL
*pbRequiresGestureTransform) = 0;
    };
```

This model is flexible, avoids fragmentation of the runtime without causing undue pain in the inner layers, and does not involve hosts understanding the internal operation of the runtime. The portability and flexibility of this solution differentiates the runtime management system from previous solutions.

FIG. 1 is a block diagram that illustrates components of the runtime management system, in one embodiment. The system 100 includes a state store 110, a host interface component 120, a pause rendering component 130, a pause execution component 140, a resume component 150, and an OS interface component 160. Each of these components is described in further detail herein.

The state store 110 manages state information related to pausing and resuming tasks in progress within a runtime running on a computing device. The state store 110 may include one or more in-memory data structures, files, databases, cloud-based storage services, or other storage facilities for persisting data. In some embodiments, the runtime manages a list of animations and timelines for displaying the animations that constitute part of a rendering pipeline. Upon pausing rendering, the state store 110 may include information about the list of animations and their current state, so that upon resuming the system 100 can reinstate the list and continue the rendering pipeline at an appropriate point in time. The runtime may also manage one or more dispatch items that represent tasks being performed by the runtime. Upon pausing execution, the system 100 may persist the list of dispatch items to the state store 110 so that the system can resume processing the list later.

The host interface component 120 provides a programmatic interface through which application hosts manage the execution state of the runtime to turn on and off parts of the runtime. The host interface component 120 may provide one or more APIs that are available to a variety of programming languages and application types. Those of ordinary skill in the art will recognize several models for exposing APIs between a runtime and a host application. The runtime management system 100 exposes APIs that allow pausing rendering, pausing execution, and resuming either or both. In some embodiments, the runtime may provide additional levels of granularity of the subsystems that a host can pause in addition to those listed as examples herein.

The pause rendering component 130 performs a break in the rendering pipeline of the runtime to turn off the processing of the runtime's rendering subsystem. Rendering is often one of the most resource intensive tasks of a runtime that provides user interface elements, and the ability to pause rendering can save substantial resources on resource-limited devices. The pause rendering component 130 removes any animations in progress from a tree of animation timelines managed by the runtime and places these animations on a resume list managed by the state store 110. The pause rendering component 130 may also stop a compositor that is currently rendering items. For content items that include audio and video, the component 130 may pause the video but allow the audio to continue. The component 130 removes video only items from the rendering pipeline.

In some embodiments, a pause of rendering is a less invasive operation that can be more easily resumed than pausing execution. The system 100 may be balanced to perform less tear down during a pause of rendering than a pause of execution. For example, the runtime may manage graphical objects such as MICROSOFT™ DIRECTX™ or other surfaces or devices that the pause rendering component 130 caches and keeps in place for future use after rendering resumes. Setting up such devices and the compositor previously mentioned may consume more resources than is desirable when pausing rendering. In some embodiments, the system 100 provides configuration options that allow the application host to tune such decisions to properly balance tradeoffs in resource consumption expected by the application host.

The pause execution component 140 performs a break in the execution of runtime processes to turn off the runtime's core processing. The component 140 may walk a tree of operations in progress within the runtime, handling each item as appropriate to shut it down. For example, the component 140 may through away any cache composition surfaces, tear down MICROSOFT™ DIRECTX™ or other graphical devices, destroy the compositor object, stop media, destroy in-memory items related to stopped media, and so forth. A break in execution is similar to a near shutdown state with the intention that the runtime consume substantially fewer resources than when executing. In a mobile device, the pause execution state may be invoked by a host when the device is locked (e.g., closing the device to place in the user's pocket or displaying a lock screen), when no applications are running, and so forth.

In some embodiments, the pause execution component 140 notifies applications or other processes that a pause in execution has been requested. The runtime may allow applications a limited amount of time to store state information or complete tasks before pausing the application's execution. This can be helpful to allow the application to end in a known good state and gracefully complete or pause tasks in progress.

The resume component 150 resumes execution of the runtime after a break in rendering or execution. The component 150 first determines the type of pause previously requested and then performs appropriate steps to bring the runtime back to a running state. For example, the resume component 150 may access the state store 110 to identify items that were in progress before the runtime was paused, and then take actions to reinstate processing of those items. For rendering operations, the component 150 copies animations back onto a list of active animations in the rendering pipeline. If the graphical objects and/or compositor were destroyed, then resuming recreates these objects so that they can be used to continue rendering where it left off. Resuming starts the rendering pipeline and any execution that was previously paused.

Pausing and resuming may happen frequently in mobile devices, such as during application switching, when a user brings up a lock screen, when a pop-up dialog is displayed (e.g., due to an arriving phone call), when an application jumps to a browser application, and so forth. Pausing allows the prior application to be placed in a dormant state where fewer resources are consumed, while resuming allows the application to return to a running state quickly.

The OS interface component 160 provides an interface between the runtime and an underlying operating system (OS) that manages hardware resources of the computing device. The runtime uses the OS interface component 160 to access state and other information from the operating system, and to carry out operations such as persisting state to the state store 110 for pausing and resuming. The OS interface component 160 may include APIs for managing processes, threads, storage devices, application state, and other information useful to the runtime for performing runtime tasks or changing runtime state.

The computing device on which the runtime management system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
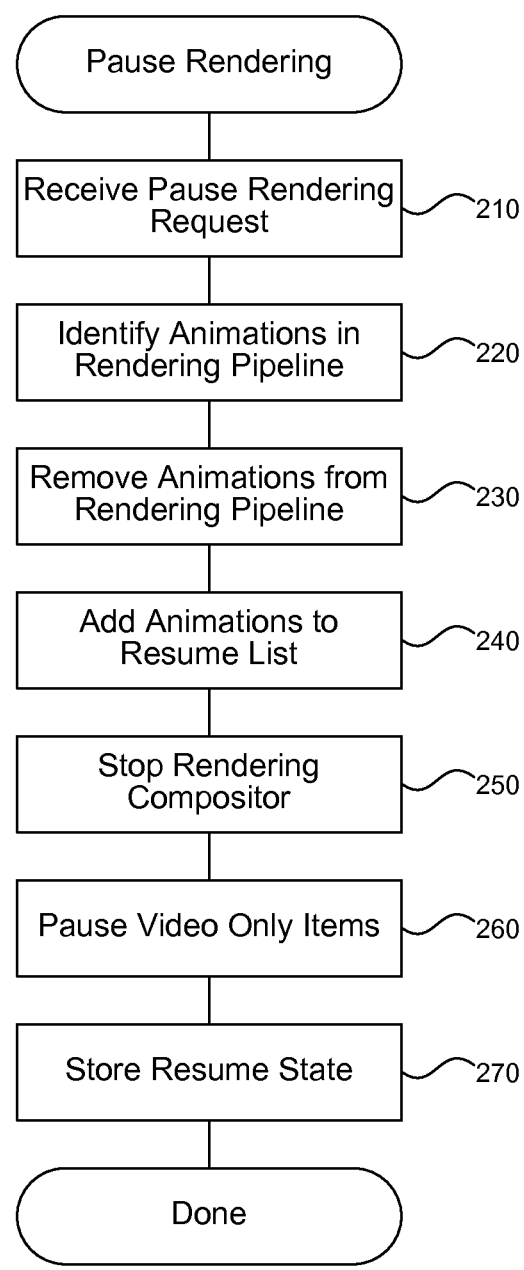
FIG. 2 is a flow diagram that illustrates processing of the runtime management system to pause a rendering pipeline of a runtime, in one embodiment.

FIG. 2 is a flow diagram that illustrates processing of the runtime management system to pause a rendering pipeline of a runtime, in one embodiment. Beginning in block 210, the system receives a request to pause rendering of an application using a runtime that provides a rendering subsystem. The request is received through an API provided by the runtime to the application for controlling execution state of the runtime. The API may provide one or more options that the application can set to request different levels of pausing to reduce resource usage of the runtime down to a predetermined level. Continuing in block 220, the system identifies one or more animations scheduled to render in a rendering pipeline. For example, the animations may represent window movements, button presses, web page animations, multimedia content, and so forth. The rendering pipeline maintains a schedule of animations to be performed in accordance with a clock. Continuing in block 230, the system removes the identified animations from the rendering pipeline to pause rendering of the animations. Alternatively, the system may mark the animations as paused and leave them in the rendering pipeline queue so that the animations can be resumed by changing their state. Continuing in block 240, the system adds the paused animations to a resume list for subsequently resuming the animations. The resume list allows the runtime to come out of the paused state upon request by the application, as described further with reference to FIG. 4.

Continuing in block 250, the system stops a rendering compositor from rendering software graphical objects to one or more hardware graphics devices. The compositor prepares one or more rendering items for display to a screen or other display device, and stopping the compositor stops the preparation of rendering items for display. Continuing in block 260, the system pauses video only items. Video only items are content items that do not include an audio portion. For content items that contain audio, the system will continue to play the audio during rendering, and these items will not be paused completely so that the audio can still play as scheduled. For video only items, however, the system can pause them to stop rendering of these items and reduce the resources consumed by the runtime.

Continuing in block 270, the system stores resume state information so that the runtime can resume rendering upon request by the application. For example, the system may persist resume state information to a file or other data storage facility for later access. After block 270, these steps conclude.

Figure 3:
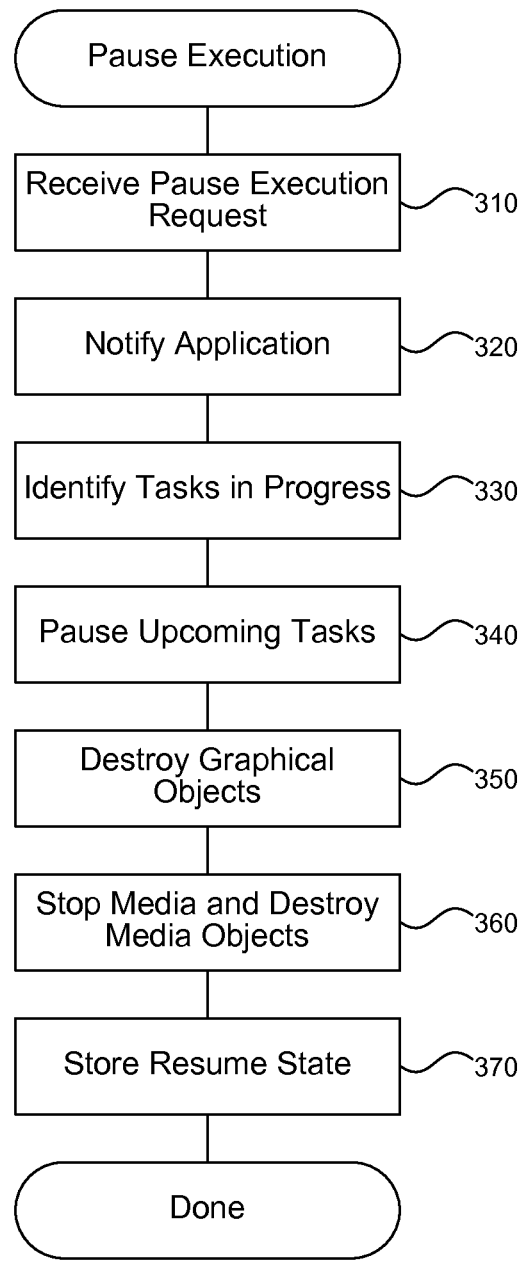
FIG. 3 is a flow diagram that illustrates processing of the runtime management system to pause execution of a runtime, in one embodiment.

FIG. 3 is a flow diagram that illustrates processing of the runtime management system to pause execution of a runtime, in one embodiment. Beginning in block 310, the system receives a request to pause execution of an application using a runtime that provides a task execution subsystem. The request is received through an API provided by the runtime to the application for controlling execution state of the runtime. The API may provide one or more options that the application can set to request different levels of pausing to reduce resource usage of the runtime down to a predetermined level.

Continuing in block 320, the system notifies an application hosting the runtime that execution of the runtime will pause after a determined period. Based on the notification, the application may store state information or conclude tasks that are in progress so that the application can cleanly enter the paused state and resume smoothly upon a subsequent request.

Continuing in block 330, the system identifies tasks scheduled to execute within the runtime. For example, the runtime may manage one or more dispatch items, rendering tasks, input handling tasks, and so forth in a queue or tree of items. The system identifies the items schedule to execute by walking the tree or other data structure used by the runtime to schedule tasks. Continuing in block 340, the system pauses the identified tasks to stop execution of tasks within the runtime. For example, the system may mark the tasks not ready to execute (e.g., paused) or remove the tasks from a queue of tasks scheduled to execute. In cases where the runtime passes tasks to the operating system for execution, the pausing stops further tasks from being handed to the operating system until the runtime is resumed.

Continuing in block 350, the system destroys one or more graphical objects associated with a rendering subsystem of the runtime. Unlike pausing online rendering, where graphics objects that take time to create may be kept so that rendering can resume quickly, a pause of execution is a deeper level of pause that may include tearing down objects that will be recreated upon resuming the runtime. Pausing of execution is expected in many cases to last long enough that freeing the extra resources by tearing down these objects is a reasonable performance tradeoff. Continuing in block 360, the system stops any media playback and destroys any objects associated with media items. For example, the runtime may be playing a multimedia file or displaying one or more animations, and pausing execution terminates the display of such items that will be resumed later.

Continuing in block 370, the system stores resume state information so that the runtime can resume execution upon request by the application. For example, the system may persist resume state information to a file or other data storage facility for later access. After block 370, these steps conclude.

Figure 4:
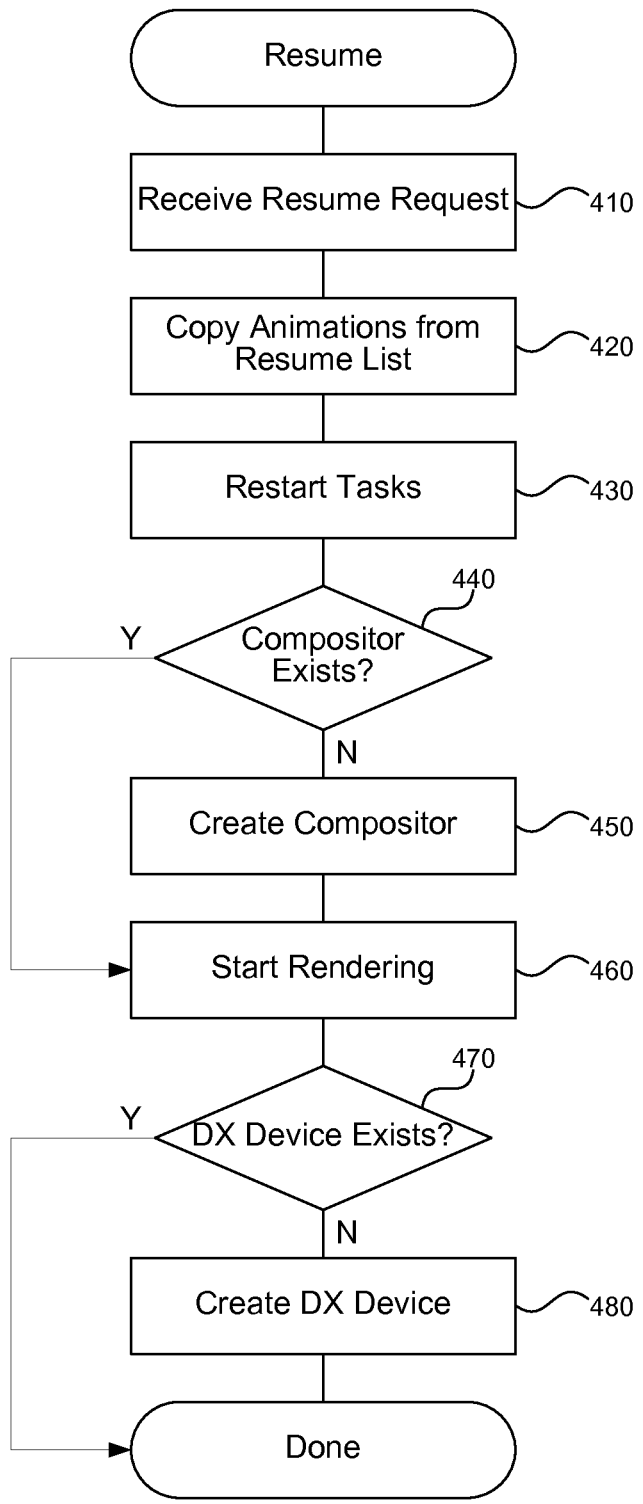
FIG. 4 is a flow diagram that illustrates processing of the runtime management system to resume execution and rendering of a runtime, in one embodiment.

FIG. 4 is a flow diagram that illustrates processing of the runtime management system to resume execution and rendering of a runtime, in one embodiment. Beginning in block 410, the system receives a request to resume execution or rendering of an application using a runtime that provides a task execution subsystem. The request is received through an API provided by the runtime to the application for controlling execution state of the runtime. The API may provide one or more options that the application can set to request different levels of resuming to precisely control the runtime's resource usage. In some embodiments, the system determines a pause type from which the system is resuming to determine the actions needed to resume the runtime.

Continuing in block 420, the system copies animations from a resume list stored previously to a rendering pipeline of active rendering tasks. For example, the system may store animations from a rendering pipeline to a resume list when rendering is paused and then restore the animations back to the rendering pipeline when rendering is resumed. Continuing in block 430, the system restarts any paused execution tasks managed by the runtime. For example, when execution is paused, the system may mark tasks as paused or remove the items from a dispatch queue and store them on a resume list or other list to be restored upon resuming.

Continuing in decision block 440, if the system determines that a graphics compositor exists, then the system jumps to block 460, else the system continues at block 450.

Continuing in block 450, the system creates a graphics compositor for managing rendering tasks in the rendering pipeline. The compositor prepares items in the rendering pipeline for display using graphical hardware of a computing device on which the runtime executes. Some levels of pause may destroy the compositor while others may not, so the system determines whether a compositor is available before creating one.

Continuing in block 460, the system starts rendering by instructing the rendering pipeline to resume processing items. For example, the system may schedule rendering tasks for execution by a CPU or GPU or the computing device on which the runtime is executing.

Continuing in decision block 470, if the system determines that one or more graphics objects used for rendering exists, then the system completes and begins rendering items, else the system continues to block 480. Continuing in block 480, the system creates one or more graphics objects used for rendering. For example, the system may create a MICROSOFT™ DIRECTX™ device for interacting with graphical hardware, such as a screen, display buffer, and other hardware of the computing device. Different levels of pause may tear down these objects and if they do not exist, resuming recreates them. After block 480, these steps conclude.

Figure 5:
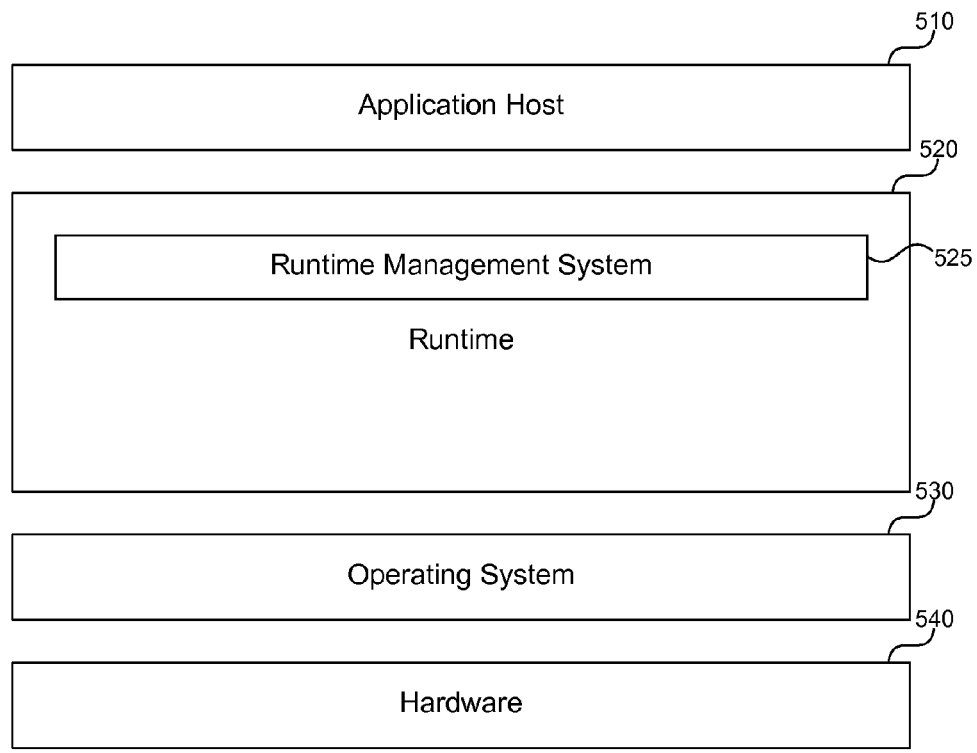
FIG. 5 is a block diagram that illustrates an environment in which the runtime management system operates, in one embodiment.

FIG. 5 is a block diagram that illustrates an environment in which the runtime management system operates, in one embodiment. An application host 510 invokes a runtime 520 to perform one or more tasks related to the application's purpose. For example, the runtime 520 may manage rendering, decoding of video objects, scheduling of tasks, and so forth. The runtime 520 interacts with an operating system 530 to control hardware 540 of a computing device. The hardware 540 may include a display screen, one or more input devices, a CPU, a GPU, a cellular radio, and other hardware. The hardware 540 also includes a power source, such as a battery.

The power resources of the hardware may be limited, and the processing requested by the runtime 520 places demands on the available power of the device. The runtime management system 525 provides a facility through which the application host 510 can control the processing of the runtime 520 to reduce the demands of the runtime 520 on the available power of the device under various conditions determined by the application host 510. For example, the application host 510 may detect that it is being moved to the background so that another application can occupy the foreground. The application host 510 may instruct the runtime 520 to pause execution in such conditions until the application host 510 is restored to the foreground (e.g., by the other application exiting or the user choosing to switch applications).

In some embodiments, the runtime management system provides a one-to-one relationship between hosts and runtimes. For example, for a computing device that multitasks between multiple applications, each application may include a runtime that can be paused and resumed according to the methods described herein. Each application manages the state of its own runtime to determine resources used by that application under various conditions. Alternatively or additionally, the system may provide a device-wide runtime instance that manages processes across applications so that power consumption can be reduced based by an operating system or other device-level actor.

In some embodiments, the runtime management system fully kills an application rather than pausing execution. For example, the runtime may detect that restarting the application is faster than placing each of the application's ongoing tasks in a paused state. In such cases, the system may notify the application that it is terminating and then terminate the application. The application can be run again later by the user or by a system request.

In some embodiments, the runtime management system serializes application state to place the application in a hibernation state. Hibernation is commonly used in computer systems to perform an operating system level shutdown, but the runtime management system can apply serialization and hibernation at an application level to shut down individual applications. While hibernation similarly reduces resource consumption, pausing and resuming is often faster and thus may be selected in cases where fast resuming is useful. Hibernation typically copies an application's memory state to persistent storage and halts execution in a way that the memory state can be subsequently restored and execution continued.

In some embodiments, the runtime management system operates on non-mobile devices to reduce power consumption. For example, the system can be applied to desktop operating systems to pause applications, such as upon a user request to minimize a window or switch foreground applications. The system allows any runtime to provide application-level controls for managing the runtime power consumption and the execution state of various subsystems within the runtime.

In some embodiments, the runtime management system allows applications to identify individual subsystems of the runtime to pause and/or resume. A runtime may include many subsystems and the ability to turn on and off individual subsystems allows applications a finer granularity of control over the runtime's consumption of resources. For example, a runtime may include a subsystem for managing network communications, rendering, file access, and other tasks some of which are not used by applications at all times and can be paused to save resources.

In some embodiments, the runtime management system provides multiple levels of pause that applications can request for a particular runtime subsystem. For example, an application may request that normal priority tasks be paused but that high priority tasks continue to execute. This allows the application finer gained control and allows saving some resources while continuing to ensure responsiveness for important tasks.

From the foregoing, it will be appreciated that specific embodiments of the runtime management system have been described herein for purposes of illustration, but that various modifications may be made without deviating from the spirit and scope of the invention. Accordingly, the invention is not limited except as by the appended claims.

What is claimed is:

1. A computer-implemented method, comprising:
  receiving a first request to pause rendering of an animation; and
  responsive to the receiving a first request:
    accessing a rendering pipeline of a runtime that contains a list of items to be rendered according to one or more corresponding timelines, the list of items including audio items and video items;
    identifying video items in the rendering pipeline;
    removing the video items which are associated with an animation from the rendering pipeline, without removing the audio items from the rendering pipeline, to facilitate pausing of the rendering of the animation and without pausing audio that is also associated with the animation; and
    in addition to removing the video items from the rendering pipeline, stopping a rendering compositor that is configured to perform the rendering, and to thereby alter power consumption of a device comprising the rendering compositor.

2. The method of claim 1, comprising adding the animation to a resume list responsive to the receiving a first request.

3. The method of claim 1, the receiving a first request comprising receiving the first request responsive to a lock screen being displayed on the device.

4. The method of claim 1, the animation comprising a web page animation.

5. The method of claim 1, the receiving a first request comprising receiving the first request responsive to a pop-up dialog being displayed on the device.

6. The method of claim 1, wherein the first request is responsive to a determination that a media application associated with the animation is obscured by another application.

7. A system, comprising:
  one or more processing units; and
  memory comprising instructions that when executed by at least one of the one or more processing units perform a method, comprising:
    receiving a first request to pause rendering of an animation associated with video items in a runtime pipeline; and
    responsive to the receiving a first request:
      marking the video items in the rendering pipeline associated with the animation without actually removing the video items from the rendering pipeline, and in such a manner as to effectively prevent processing of the video items that are marked in the runtime pipeline until a state of the video items that are marked is changed, and without pausing rendering of audio associated with the animation.

8. The system of claim 7, the animation associated with a timeline.

9. The system of claim 7, the method comprising adding the animation to a resume list responsive to the receiving a first request.

10. The system of claim 7, the receiving a first request comprising receiving the first request responsive to a lock screen being displayed on a device upon which the animation is rendered.

11. The system of claim 7, the animation comprising a web page animation.

12. The system of claim 7, the receiving a first request comprising receiving the first request responsive to a pop-up dialog being displayed on a device upon which the animation is rendered.

13. The system of claim 7, wherein the first request is responsive to a determination that a media application associated with the animation is obscured by another application.

14. One or more hardware storage device having stored computer-executable instructions which are executable by one or more processors of a computing system to cause the computing system to perform the following:
  identify video items associated with an animation from a rendering pipeline; and
  pause rendering of the animation without pausing audio that is also associated with the animation when the rendering of the animation is paused and by at least one of (a) removing the video items from the rendering pipeline or (b) marking the video items in the rendering pipeline that are associated with the animation as not ready for rendering.

15. The one or more hardware storage device of claim 14, the animation associated with a timeline.

16. The one or more hardware storage device of claim 14, the method comprising adding the animation to a resume list.

17. The one or more hardware storage device of claim 14, the animation comprising a web page animation.

18. The one or more hardware storage device of claim 14, the animation comprising video.

19. The one or more hardware storage device of claim 14, the removing performed responsive to at least one of:
 a lock screen being displayed on a device upon which the animation is rendered; or
 a pop-up dialog being displayed on the device.

20. The one or more hardware device of claim 14, wherein the pausing is initiated responsive to a determination that a media application associated with the animation is obscured by another application.

\* \* \* \* \*